US 11,249,763 B2

(12) United States Patent
Okazaki et al.

(10) Patent No.: US 11,249,763 B2
(45) Date of Patent: Feb. 15, 2022

(54) ARITHMETIC PROCESSING UNIT AND CONTROL METHOD FOR ARITHMETIC PROCESSING UNIT

(71) Applicant: FUJITSU LIMITED, Kawasaki (JP)

(72) Inventors: Ryohei Okazaki, Kawasaki (JP); Yasunobu Akizuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/266,448

(22) Filed: Feb. 4, 2019

(65) Prior Publication Data
US 2019/0294435 A1 Sep. 26, 2019

(30) Foreign Application Priority Data
Mar. 26, 2018 (JP) .............................. JP2018-057738

(51) Int. Cl.
*G06F 9/38* (2018.01)
*G06F 9/30* (2018.01)
*G06F 7/57* (2006.01)
*G06F 9/54* (2006.01)

(52) U.S. Cl.
CPC ................ *G06F 9/382* (2013.01); *G06F 7/57* (2013.01); *G06F 9/3001* (2013.01); *G06F 9/30065* (2013.01); *G06F 9/381* (2013.01); *G06F 9/3804* (2013.01); *G06F 9/3814* (2013.01); *G06F 9/544* (2013.01)

(58) Field of Classification Search
CPC ........ G06F 9/382; G06F 9/3822; G06F 9/381; G06F 9/3814
See application file for complete search history.

(56) References Cited

U.S. PATENT DOCUMENTS

| 5,233,696 A * | 8/1993 | Suzuki ............... G06F 9/30149 |
| | | 712/204 |
| 2014/0122831 A1 | 5/2014 | Uliel et al. |
| 2015/0227374 A1* | 8/2015 | Blasco ............... G06F 9/30189 |
| | | 712/240 |

FOREIGN PATENT DOCUMENTS

| JP | 8-504044 | 4/1996 |
| JP | 2014-89699 | 5/2014 |
| WO | 94/12929 | 6/1994 |

* cited by examiner

Primary Examiner — Jyoti Mehta
Assistant Examiner — Kasim Alli
(74) Attorney, Agent, or Firm — Staas & Halsey, LLP

(57) ABSTRACT

An arithmetic processing unit includes an instruction decoder which decodes a fetch instruction to issue an execution instruction; a reservation station which temporarily stores the execution instruction; and an arithmetic unit which executes the execution instruction, and the fetch instruction includes a multi-flow instruction which is divided into divided instructions and a single instruction. The instruction decoder includes: a pre-decoder including N number of slots each of which divides the multi-flow instruction into divided instructions; a main decoder including N number of slots each of which decodes the instructions to issue an execution instruction; and a pre-decoder buffer including N–K number of slots each of which temporarily stores instructions in the pre-decoder. The instruction decoder repeats transferring the divided instructions and the single instructions from the slots of the pre-decoder and the slots of the pre-decoder buffer to the main decoder as much as possible in order.

6 Claims, 12 Drawing Sheets

FIG. 6

| Cycle | C0 | C1 | C2 | C3 | C4 | C5 | C6 |
|---|---|---|---|---|---|---|---|
| SLOT PD0 ML_1 (3 dl) | E | PD0 | D0,1,2 3 flow | | | | |
| SLOT PD1 ML_2 (6 dl) | E | PD1 | D3 1 flow | | | | |
| SLOT PD2 ML_3 (2 dl) | E | PD2 | | | | | |
| SLOT PD3 SI_4 | E | PD3 | | | | | |
| (INSTRUCTION IS TRANSFERRED FROM PD1 - PB0) ML_2 (6 dl) | | | PB0 | D0,1,2,3 4 flow | D0 1 flow | | |
| (INSTRUCTION IS TRANSFERRED FROM PD2 - PB1) ML_3 (2 dl) | | | PB1 | PB1 | D1,2 2 flow | | |
| (INSTRUCTION IS TRANSFERRED FROM PD3 - PB2) SI_4 | | | PB2 | PB2 | D3 | | |
| SLOT PD0 SI_5 | E | | PD0 | PD0 | PD0 | D0 | |
| SLOT PD1 SI_6 | E | | PD1 | PD1 | PD1 | D1 | |
| SLOT PD2 SI_7 | E | | PD2 | PD2 | PD2 | D2 | |
| SLOT PD3 SI_8 | E | | PD3 | PD3 | PD3 | D3 | |

FIG.7

| CYCLE | C0 | C1 | C2 | C3 | C4 | C5 | C6 |
|---|---|---|---|---|---|---|---|
| PD0 | E | ML_1 (3 dI) | SI_5 | SI_5 | SI_5 | SI_9 | |
| PD1 | E | ML_2 (6 dI) | SI_6 | SI_6 | SI_6 | SI_10 | |
| PD2 | E | ML_3 (2 dI) | SI_7 | SI_7 | SI_7 | SI_11 | |
| PD3 | E | SI_4 | SI_8 | SI_8 | SI_8 | SI_12 | |
| PB0 | | | ML_2 (5 dI) | ML_2 (1 dI) | | | |
| PB1 | | | ML_3 (2 dI) | ML_3 (2 dI) | | | |
| PB2 | | | SI_4 | SI_4 | | | |
| D0 | | | ML_11 | ML_22 | ML_26 | SI_5 | SI_9 |
| D1 | | | ML_12 | ML_23 | ML_31 | SI_6 | SI_10 |
| D2 | | | ML_13 | ML_24 | ML_32 | SI_7 | SI_11 |
| D3 | | | ML_21 | ML_25 | SI_4 | SI_8 | SI_12 |

FIG.11

| cycle | C0 | C1 | C2 | C3 | C4 | C5 | C6 | C7 | C8 | C9 | C10 | |
|---|---|---|---|---|---|---|---|---|---|---|---|---|
| MULTI-FLOW INSTRUCTION ML_1 SLOT D0 | E | D0 | DM1 | DM2 | DM3 | | | | | | | INSTRUCTION RELEASE |
| SUBSEQUENT MULTI-FLOW INSTRUCTION ML_2 SLOT D1 | E | D1 | D1 | D1 | D1 | D1 | DM1 | DM2 | DM3 | | | |
| SUBSEQUENT SINGLE INSTRUCTION SI_3 SLOT D2 | E | D2 | D2 | D2 | D2 | D2 | D2 | D2 | D2 | D2 | | |
| SUBSEQUENT SINGLE INSTRUCTION SI_4 SLOT D3 | E | D3 | D3 | D3 | D3 | D3 | D3 | D3 | D3 | D3 | | |
| | | | SUBSEQUENT INSTRUCTIONS WAIT IN D UNTIL ALL PREVIOUS MULTI-FLOW INSTRUCTIONS ARE RELEASED | | | | | | | | | |
| SUBSEQUENT SINGLE INSTRUCTION SI_5 SLOT D0 | | | | | | | | | | E | D0 | |
| SUBSEQUENT SINGLE INSTRUCTION SI_6 SLOT D1 | | | | | | | | | | E | D1 | |
| SUBSEQUENT SINGLE INSTRUCTION SI_7 SLOT D2 | | | | | | | | | | E | D2 | |
| SUBSEQUENT SINGLE INSTRUCTION SI_8 SLOT D3 | | | | | | | | | | E | D3 | |
| MF_TGR | | | 1 | 1 | 1 | 1 | 1 | 1 | 1 | | | |

FIG.12

| CYCLE | C0 | C1 | C2 | C3 | C4 | C5 | C6 | C7 | C8 | C9 | C10 |
|---|---|---|---|---|---|---|---|---|---|---|---|
| D0 | ML_1 (4 dI) | ML_11 | | | | | | | | | |
| D1 | ML_2 (4 dI) | ML_2 (4 dI) | ML_2 (4 dI) | ML_2 (4 dI) | ML_2 (4 dI) | ML_21 | | | | | |
| D2 | SI_3 | SI_3 | SI_3 | SI_3 | SI_3 | SI_3 | SI_3 | SI_3 | SI_3 | SI_3 | |
| D3 | SI_4 | SI_4 | SI_4 | SI_4 | SI_4 | SI_4 | SI_4 | SI_4 | SI_4 | SI_4 | |
| M_INST_DIV | | | MI_12 | MI_13 | MI_14 | | MI_22 | MI_23 | MI_24 | | |
| | | | | | | | | | | | SI_5 |
| | | | | | | | | | | | SI_6 |
| | | | | | | | | | | SI_3 | SI_7 |
| | | | | | | | | | | SI_4 | SI_8 |

ARITHMETIC PROCESSING UNIT AND CONTROL METHOD FOR ARITHMETIC PROCESSING UNIT

CROSS-REFERENCE TO RELATED APPLICATION

This application is based upon and claims the benefit of priority of the prior Japanese Patent Application No. 2018-057738, filed on Mar. 26, 2018, the entire contents of which are incorporated herein by reference.

FIELD

The present invention relates to an arithmetic processing unit, and a control method for the arithmetic processing unit.

BACKGROUND

An arithmetic processing unit is a processor or a central processing unit (CPU). The processor includes an instruction cache in which fetch instructions fetched from a main memory are registered, and an instruction buffer which temporarily stores instructions fetched from the instruction cache. Further, the processor includes an instruction decoder which decodes and issues instructions stored in the instruction buffer in the program order (in order), and a reservation station which stores a decoded instruction in an instruction queue. An instruction queued in the reservation station is executed by an arithmetic unit when execution of an instruction is being ready. The instruction buffer and the instruction decoder have a pipeline configuration, and process the instructions in order synchronizing with an internal clock of the processor.

In order to increase the throughput of the decoding processing of the fetch instructions, the instruction decoder includes a plurality of slots, so that a plurality of fetch instructions are decoded in parallel in the plurality of slots, and a plurality of decoded execution instructions are queued in the reservation station in parallel. This kind of processor is disclosed, for example, in Japanese Laid-open Patent Publication No. 2014-089699 and Japanese National Publication of International Patent Application No. H08-504044.

SUMMARY

In recent years, processors are required to execute a plurality of divided instructions (micro-instructions) generated by dividing a fetch instruction. For example, a complicated instruction, which is executed using many registers, is divided into a plurality of simple divided instructions, and the plurality of divided instructions are executed in order, so as to improve the computing efficiency of the processor. An instruction that is divided into a plurality of divided instructions and executed is called a "multi-flow instruction". When an instruction decoder determines that an instruction is a multi-flow instruction of which dividing is preferable, a multi-flow instruction dividing unit divides the multi-flow instruction into a plurality of sub-instructions (e.g. divided instructions, micro-instructions, and micro-operation instructions, hereafter these instructions are called "divided instructions"), and queues the divided instructions in the reservation station.

However, when this multi-flow instruction is inputted to the instruction decoder which includes a plurality of slots, a multi-flow instruction dividing unit, which is disposed independently from the instruction decoder, divides the multi-flow instruction, and queues the divided instructions in the reservation station in order. As a result, the processing to divide the multi-flow instruction and the processing to issue the divided instructions temporarily drop the processing throughput of the instruction decoder which includes the plurality of slots. Since the instruction decoder is a major processing unit to control the operation of the whole pipeline circuit, this drop in throughput of the instruction decoder interrupts the processing of the processor.

According to the first aspect of the embodiments, an arithmetic processing unit comprising: an instruction decoder which decodes a fetch instruction fetched from a memory to issue an execution instruction; a reservation station which temporarily stores the execution instruction issued by the instruction decoder; and an arithmetic unit which executes the execution instruction stored in the reservation station, wherein the fetch instruction includes a multi-flow instruction which is divided into a plurality of divided instructions, and a single instruction which is not divided. The instruction decoder includes: a pre-decoder including N number of slots (N is a positive integer) each of which input the fetch instruction, detects a division number of the multi-flow instruction, and divides the multi-flow instruction into a plurality of divided instructions; a main decoder including N number of slots each of which decodes the divided instruction and the single instruction to issue an execution instruction corresponding to the divided instruction and the single instruction; and a pre-decoder buffer including N−K number of slots (K is a positive number, N>K) each of which temporarily stores instructions in the pre-decoder. The instruction decoder repeats transferring the divided instructions and the single instructions from the N number of slots of the pre-decoder and the N−K number of slots of the pre-decoder buffer to the N number of slots of the main decoder as much as possible in order, and when all the divided instructions and all the single instructions in at least the N−K number of slots of the pre-decoder buffer and first K number of slot or slots of the pre-decoder are transferred to the main decoder while the instruction decoder repeats the transferring, the instruction decoder transfers the instructions remaining in the pre-decoder to the pre-decoder buffer, and inputs the next N number of fetch instructions to the N number of slots of the pre-decoder respectively.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a timing chart for describing the operation of the instruction decoder in FIG. 4 and FIG. 5 based on a concrete example of a fetch instruction string.

FIG. 7 is a timing chart for describing the operation of the instruction decoder in FIG. 4 and FIG. 5 based on a concrete example of a fetch instruction string.

FIG. 11 is a time chart for describing the processing of a multi-flow instruction performed by the instruction decoder of the processor in FIG. 10.

FIG. 12 is a time chart for describing the processing of a multi-flow instruction performed by the instruction decoder of the processor in FIG. 10.

DESCRIPTION OF EMBODIMENTS

Figure 1:
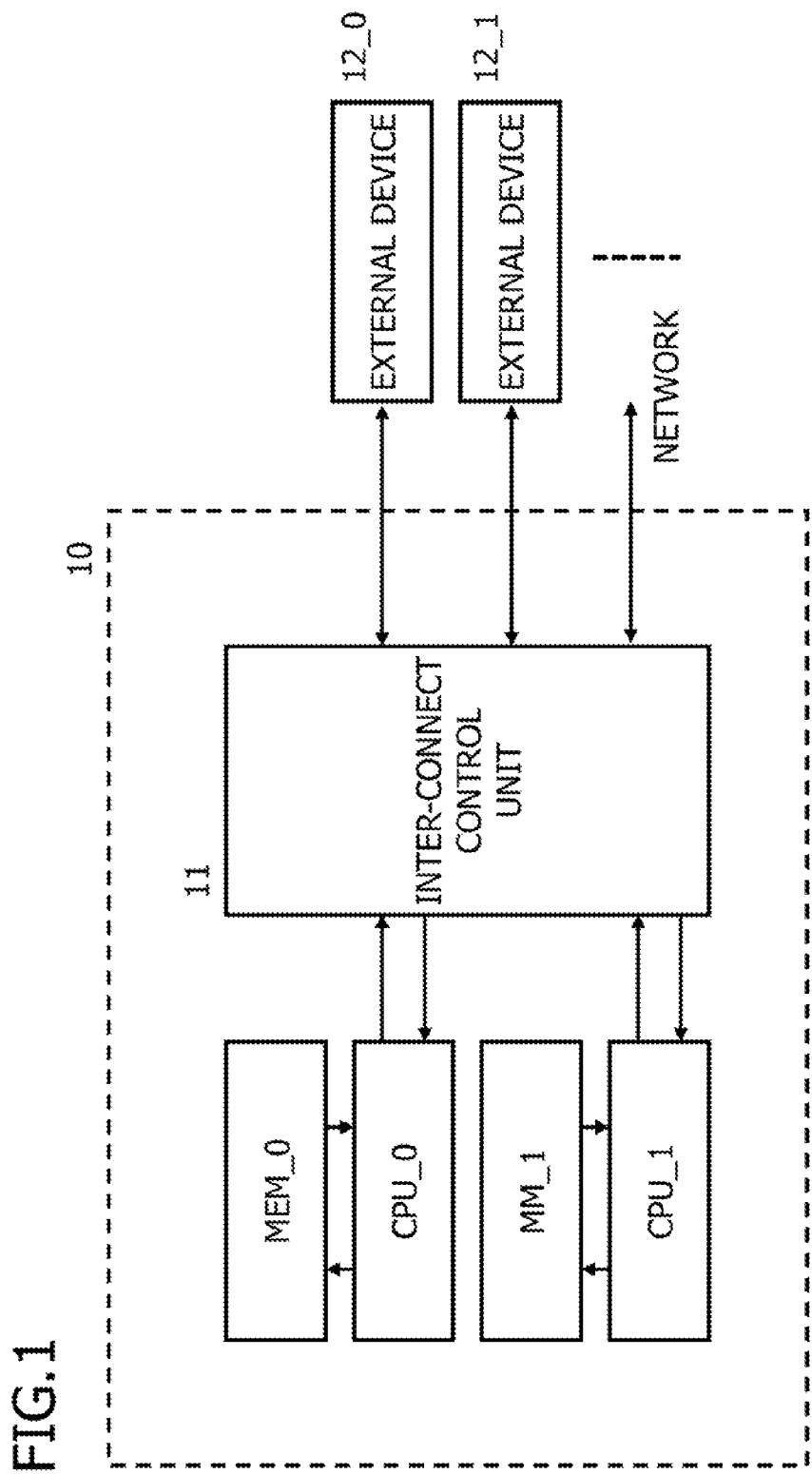
FIG. 1 is a diagram illustrating a configuration example of an information processing device according to an embodiment of the present invention.

FIG. 1 is a diagram illustrating a configuration example of an information processing device according to an embodiment of the present invention. The information processing device 10 is a computer, for example, such as a high performance computer (HPC) and a server. The information processing device includes a plurality of arithmetic processing units (processors or CPUs) CPU_0, CPU_1, a plurality of memories MEM_0, MEM_1, and an inter-connect control unit 11. Each arithmetic processing can access the respective memory. Further, the plurality of arithmetic processing units CPU_0, CPU_1 are connected to a plurality of external devices 12_0, 12_1 such as storages, and a network (not illustrated) via the inter-connect control unit (chip) 11. The inter-connect control unit 11 performs input/output control for the external devices and the network.

Figure 2:
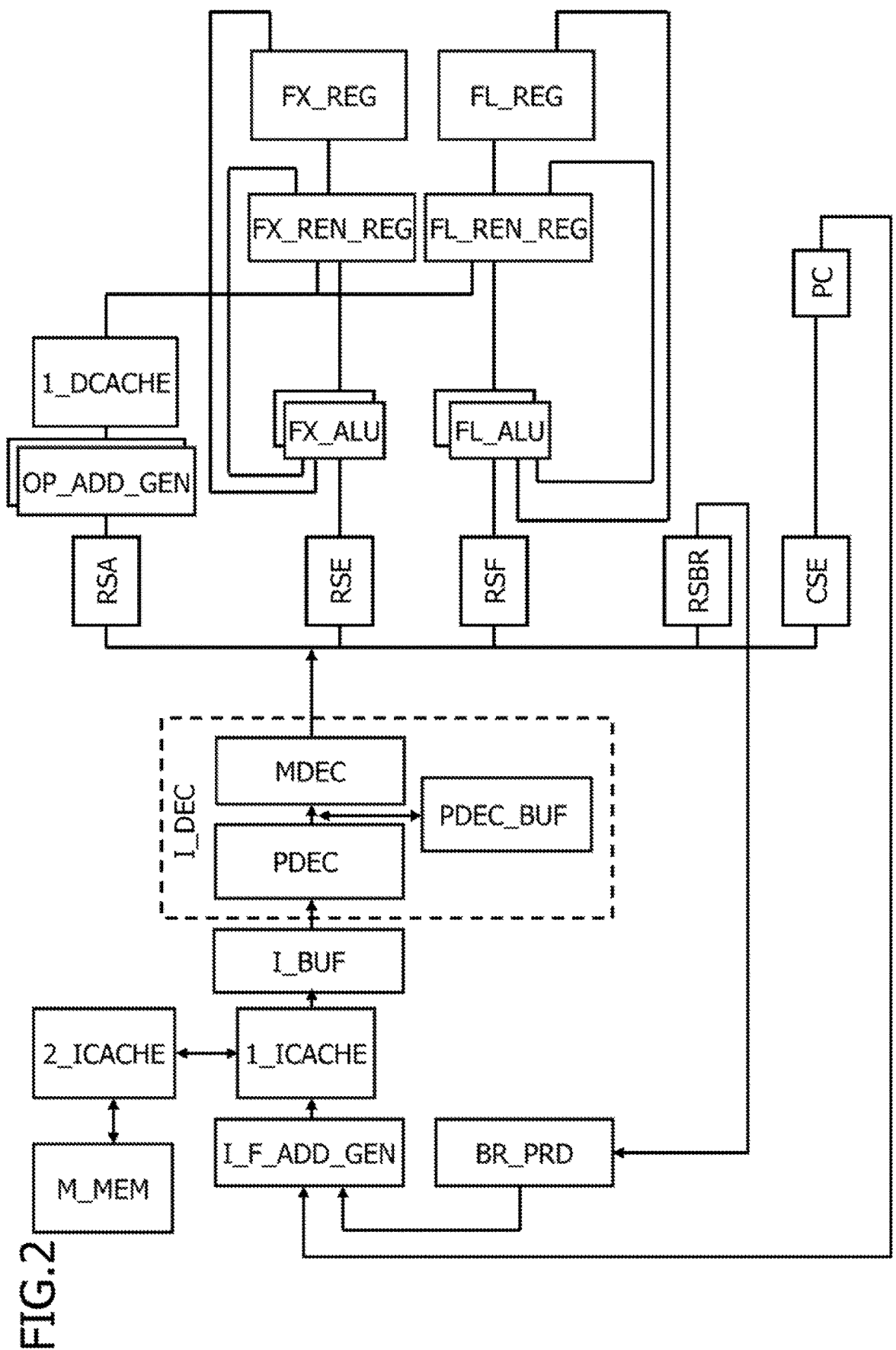
FIG. 2 is a diagram illustrating a configuration example of the arithmetic processing unit (hereafter called "processor") according to this embodiment.

FIG. 2 is a diagram illustrating a configuration example of the arithmetic processing unit (hereafter called "processor") according to this embodiment. The processor in FIG. 2 is an example of a superscalar processor. The processor of this embodiment, however, is not limited to the configuration in FIG. 2. The processor includes at least an instruction decoder I_DEC, reservation stations RSA, RSE, RSF, and arithmetic units FX_ALU, FL_ALU.

An instruction fetch address generating unit I_F_ADD_GEN generates a fetch destination address based on information of a program counter PC and a branch prediction circuit BR_PRD, reads, based on the fetch destination address, an instruction in a main memory M_MEM that is outside the processor, and registers the read instruction in a secondary instruction cache 2_ICACHE and a primary instruction cache 1_ICACHE. Then the fetch instructions read from the primary instruction cache are temporarily stored in the instruction buffer I_BUF in the program order (in order).

The instruction decoder I_DEC inputs the fetch instructions from the instruction buffer in the program order, decodes the fetch instructions to issue execution instructions. The issued execution instructions are stored in a storage called a "reservation station", which has a queue structure. The reservation station is disposed in a reservation station for execution (RSE) to perform fixed point calculation, a reservation station for floating point (RSF) to perform floating point calculation, a reservation station for address generation (RSA) to generate a main storage operand address for controlling the execution of instructions, and a reservation station for branch (RSBR) for branch instructions, for each type of execution instruction. An execution instruction issued by the instruction decoder is entered in a queue of one of the above-mentioned reservation stations in accordance with the type of instruction. The execution instruction entered in the queue is executed by the arithmetic unit or the like, not in the program order (in order), but in out of order, from the instruction which is ready for execution.

A fixed point renaming register FX_REN_REG and a fixed point register FX_ERG are disposed for the fixed point arithmetic-logic unit FX_ALU, and a floating point renaming register FL_REN_REG and a floating point register FX_ERG are disposed respectively for the floating point arithmetic unit FL_ALU. The storing of the computing result in the renaming register enables the out of order execution of the instructions.

An execution instruction issued by the instruction decoder, on the other hand, is given an instruction identifier (IID) in the program order, and is transferred to a commit stack entry CSE according to this order. The commit stack entry performs commit processing (completion processing) on the received execution instruction. The commit stack entry CSE includes a storage which has a queue structure to queue the execution instructions, issued by the instruction decoder, in the issuing order (in order), and a completion processing circuit which performs the commit processing based on the information in the queue and a completion report from each processing pipeline. An end report of an instruction which is executed in each reservation station in out-of-order is transferred from the arithmetic unit or the like to the commit stack entry. Responding to this end report, the completion processing circuit of the commit stack entry performs completion processing on the instruction corresponding to the end report, out of the queued instructions waiting for the completion report, in the program order (in order), and updates the circuit resources, such as the register(s).

An instruction in the RSA is executed by an operand address generating unit OP_ADD_GEn, and the generated operand address is stored in a primary data cache 1_DCACHE. The primary data cache stores the operand address in the renaming registers FX_REN_REG, FL_REN_REG or registers FX_REG, FL_REG.

The program counter PC outputs an address of an instruction to be executed. The branch prediction circuit BR_PRD predicts whether the branch instruction is branched, based on a branch instruction completion report of the RSBR, and outputs an address of the instruction to be executed next to the instruction fetch address generating unit.

The instruction decoder I_DEC of the processor in FIG. 2 has a two-stage configuration of a pre-decoder I_PD and a main decoder I_D, and also includes a pre-decoder buffer PDEC_BUF which temporarily stores the instructions in the pre-decoder. Before describing the instruction decoder of this embodiment, an issue that the instruction decoder of this embodiment is to solve will be described first.

Figure 10:
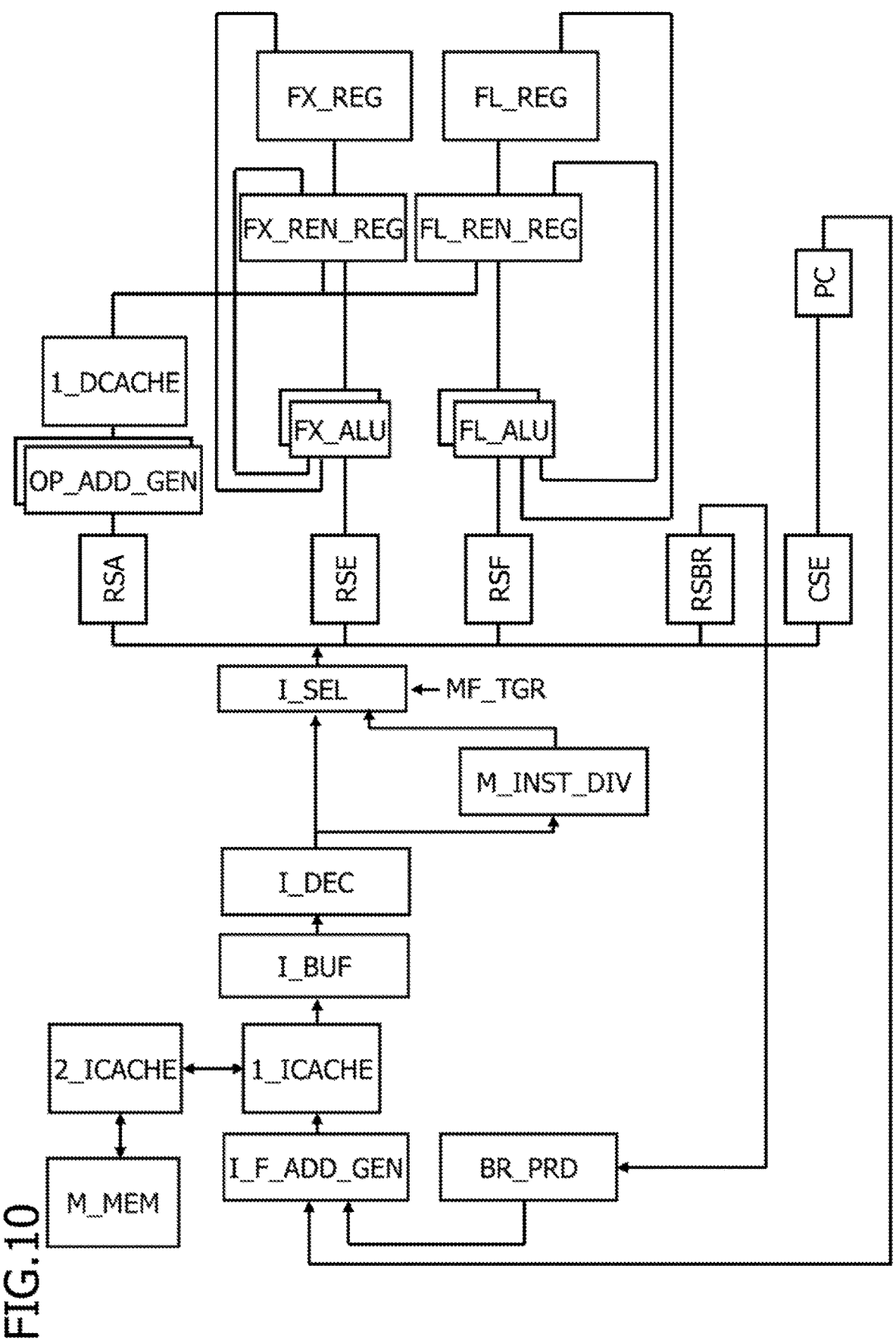
FIG. 10 is a diagram illustrating another configuration example of the processor.

FIG. 10 is a diagram illustrating another configuration example of the processor. The differences between the configuration of the processor in FIG. 10 from that in FIG. 2 are that the instruction decoder I_DEC does not have the two-stage construction PDEC/MDEC, and a multi-flow instruction dividing unit M_INST_DIV, which divides a multi-flow instruction, and an instruction selector I_SEL, which selects either the instruction decoder or the multi-flow instruction dividing unit, are included.

An example of the multi-flow instruction are as follows.

LPD X0, X1, [X2], #4

This multi-flow instruction is divided into the following processing: (1) storing a value stored at an address in the register X2 to the register X0; (2) storing a value stored at an address, determined by adding the data size ("8" if the data size is 8 bytes) to the address in the register X2, to the register X1; and (3) updating the register X2 to an address determined by adding an immediate value "4" to X2 (overwritten by an added address).

In this case, the above-mentioned multi-flow instruction is divided into the following two load instructions and an addition instruction, and these instructions are executed. The following three instructions are examples of the divided instructions generated by dividing the multi-flow instruction.

Load X0, [X2]

Load X1, [X2+8]

Add X2, X2, #4

The instruction decoder I_DEC includes a plurality of slots (not illustrated), which decode a plurality of fetch instructions supplied from the instruction buffer I_BUF respectively, and issue the respective execution instructions. This means that the plurality of slots of the instruction decoder decode the plurality of fetch instructions in parallel, and issue the respective execution instructions in parallel.

A multi-flow instruction is one instruction that is divided into a plurality of flows (instructions), and is executed in the divided state. In the case when a fetch instruction, which is supplied to the instruction decoder, is a multi-flow instruction, a slot of the instruction decoder, to which the multi-flow instruction is supplied, decodes the instruction, determines that it is preferable to divide this instruction, and transfers the multi-flow instruction to the multi-flow instruction dividing unit M_INST_DIV in the program order (in order).

The multi-flow instruction dividing unit temporarily stores the transferred multi-flow instruction, divides the multi-flow instruction into a plurality of flows (instructions), and issues one flow at a time. This divided flows (instructions) are hereafter called a "divided instructions". While the multi-flow dividing unit is issuing the divided instructions, the instruction selector I_SEL selects a divided instruction issued by the multi-flow instruction dividing unit, and transmits the divided instruction to a corresponding reservation station.

In the processor in FIG. 10, a multi-flow instruction is not generated very often, hence in the case when a fetch instruction is a multi-flow instruction, this is regarded as an exception, and the instruction decoder stops issuing instructions and the multi-flow instruction dividing unit divides the instruction and issues divided instructions. In this case, however, the throughput of the instruction decoder, including the plurality of slots, drops. The throughput of the instruction decoder refers to the number of fetch instructions that are processed by the instruction decoder in one clock cycle. This will be described using a concrete example.

FIG. 11 and FIG. 12 are time charts for describing the processing of a multi-flow instruction performed by the instruction decoder of the processor in FIG. 10. FIG. 11 indicates each clock cycle C0 to C11 and four fetch instructions MI_1, MI_2, SI_3 and SI_4, which are supplied to the four slots D0 to D3 of the instruction decoder I_DEC. And it is indicated whether each of the fetch instructions MI_1, MI_2, SI_3 and SI_4 is in an entry cycle E to the instruction decoder, a decode cycle D in which the instruction is decoded, or issuing stages D and DM in which an instruction is issued, in each clock cycle. The dot pattern means that an instruction is released or issued in FIG. 11. FIG. 12, on the other hand, indicates fetch instructions MI_1, MI_2, SI_3 and SI_4, which stay in the four slots D0 to D3 of the instruction decoder, and the multi-flow instruction dividing unit M_INST_DIV in each clock cycle C0 to C11.

According to this example, in the cycle C0, the two multi-flow instructions MI_1 and MI_2, which are divided into four flows (divided instructions) respectively, and the two single instructions SI_3 and SI_4, are supplied to the four slots D0 to D3 of the instruction decoder I_DEC in parallel (Entry cycle E). In the next cycle C1, each slot of the instruction decoder decodes the fetch instruction which is supplied respectively, and the two slots D0 and D1 determine that the first two fetch instructions are the multi-flow instructions. Along with this determination, the slot D0 issues a first flow (divided instruction) MI_11 of the multi-flow instruction MI_1, and at the same time, transfers an instruction operation code of the first multi-flow instruction MI_1 to the multi-flow instruction dividing unit, and sets a multi-flow trigger MF_TGR to "1". Then in the next three cycles C2, C3 and C4 the multi-flow instruction dividing unit issues a second flow MI_12 to a final flow MI_14 one flow at a time. Since the multi-flow trigger MF_TRG is "1", the instruction selector I_SEL selects a flow from the multi-flow instruction dividing unit. When the final flow MI_14 is issued, the multi-flow instruction dividing unit returns the multi-flow trigger MF_TGR to "0". This completes the processing of the multi-flow instruction in the slot D0.

Then in the next four cycles C5 to C8, the slot D1 and the multi-flow instruction dividing unit issue four flows MI_21 to MI_24 one flow at a time. Then in cycle C9, the slots D2 and D3 of the instruction decoder issue two single instructions SI_3 and SI_4 in parallel. As a result, the processing of the fetch instructions in the four slots of the instruction decoder completes. Then in cycle C9, the four slots of the instruction decoder simultaneously enter four single instructions SI_5 to SI_8, and simultaneously issue the four single instructions SI_5 to SI_8 in the next cycle C10. The timing of the cycle C9 is the timing of the entry E of the four single instructions SI_5, 6, 7 and 8, and the timing of D of the single instructions SI_3 and 4 and the timing of E of the subsequent single instructions SI_5, 6, 7 and 8 may overlap, due to the pipeline configuration.

As described above, in the case of simultaneously entering the four single instructions, the instruction decoder I_DEC, including the four slots, simultaneously issues the four single instructions in the next cycle, and enters the next four single instructions. This maximizes the throughput of the instruction decoder, which is four instructions. However, in the case when an entered fetch instruction includes a multi-flow instruction, the instruction decoder and the multi-flow instruction dividing unit issue a plurality of flows (divided instructions), generated by dividing unit dividing the multi-flow instruction, one flow at a time in order. During this time, the throughput of the instruction decoder drops considerably, i.e. one instruction per one clock cycle. Especially when multi-flow instructions continue, the throughput of the instruction decoder drops to one instruction, as a base of the flow after division (divided instructions).

Processor of this Embodiment

The instruction decoder I_DEC of the processor according to this embodiment in FIG. 2 has a two-stage configuration which includes a pre-decoder PDEC and a main decoder MDEC, and also includes a pre-decoder buffer PDEC_BUF which temporarily stores the instructions in the pre-decoder.

The pre-decoder PDEC and the main decoder MDEC have N number of slots (N is plural number) respectively, and have four slots (N=4) respectively in the following example. Each slot of the pre-decoder PDEC receives and holds a pre-divided multi-flow instruction and/or a single instruction. Each slot of the main decoder MDEC, on the other hand, receives and holds an instruction after dividing the multi-flow instruction (a divided instruction) or a single instruction. The pre-decoder buffer PDEC_BUF has N−K number of slots (N>K), and has three slots (N=4, K=1) in the following example. Each slot of the pre-decoder buffer PDEC_BUF temporarily stores the instructions (single instructions or pre-divided multi-flow instructions) remaining in the pre-decoder PD.

Figure 3:
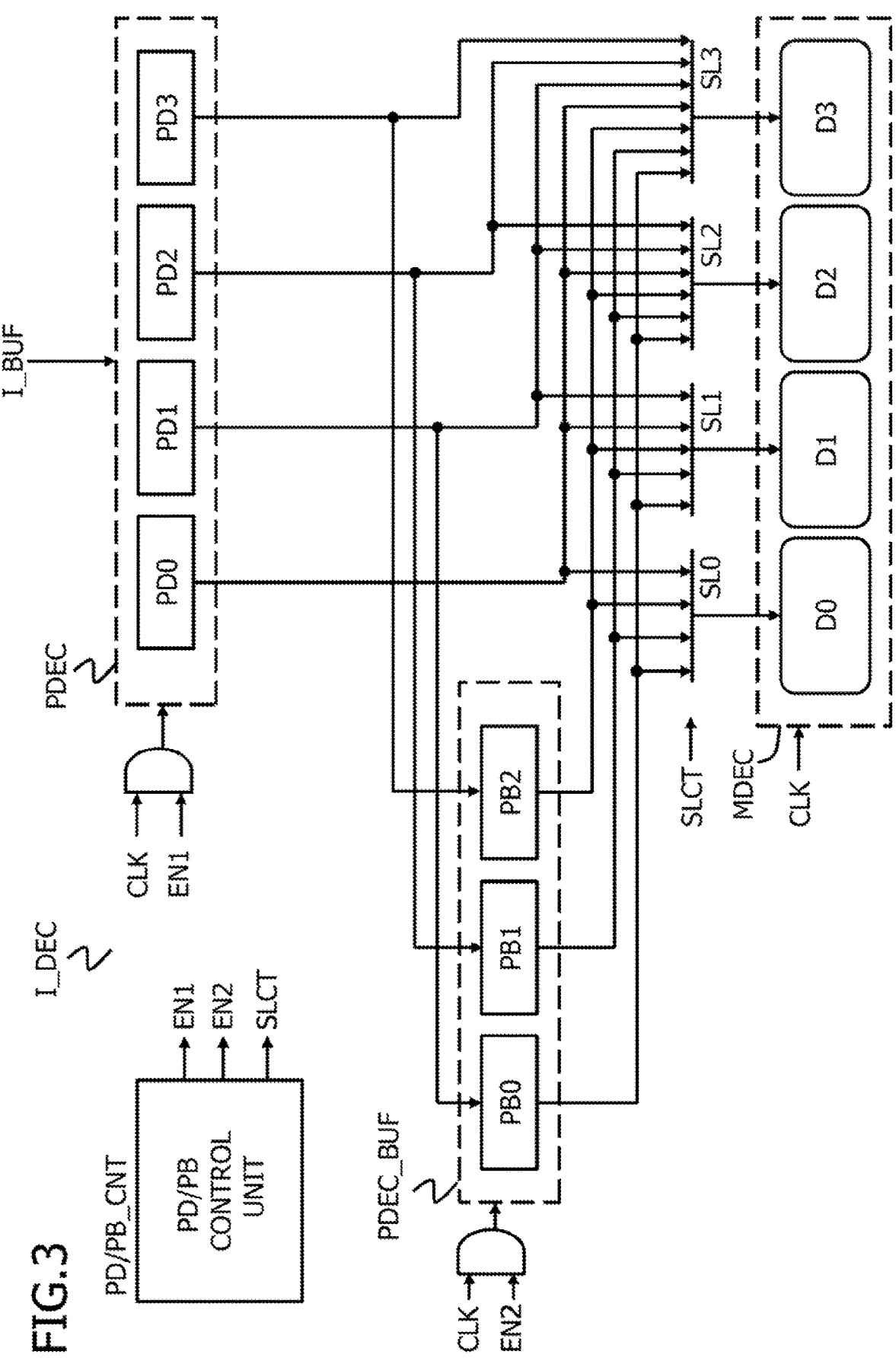
FIG. 3 is a diagram illustrating a configuration example of the instruction decoder I_DEC.

FIG. 3 is a diagram illustrating a configuration example of the instruction decoder I_DEC. The pre-decoder PDEC has four slots PD0 to PD3 to which four fetch instructions, supplied from the instruction buffer I_BUF, are simultaneously entered or inputted in order. An AND signal of the clock CLK and a first enable signal EN1 are used as control clocks to enter each four fetch instructions.

As a basic rule, the main decoder MDEC has four slots D0 to D3, to which four instructions in the four slots of the pre-decoder PDEC are simultaneously entered. In the case when any one of the slots of the pre-decoder issues a divided instruction of a multi-flow instruction, a divided instruction and/or a single instruction is entered to the four slots D0 to D3 of the main decoder as much as possible, in the order of the four slots PD0 to PD3 of the pre-decoder. A clock CLK is used as a control clock to enter the instructions in the slots D0 to D3. In the case when the queue in the reservation station does not have space, the instructions in the four slots D0 to D3 are not transferred to the reservation station, and the pipeline clock is disabled so that the state of the instruction decoder I_DEC is maintained. In the following description, it is assumed that the queue in the reservation station has space.

The pre-decoder buffer PDEC_BUF has three slots PB0 to PB2 to which fetch instructions (multi-flow instruction or single instruction) remaining in the second to fourth slots PD1, PD2 and PD3 of the pre-decoder PDEC are simultaneously entered for temporary storage. AND signal of the clock CLK and a second enable signal EN2 is used as control clock to enter the fetch instructions.

On the input side of each slot D0 to D3 of the main decoder MDEC, selectors SL0 to SL3 are disposed respectively. Thereby divided instructions or single instructions in the three slots PB0 to PB2 of the pre-decoder buffer and four slots PD0 to PD3 of the pre-decoder are entered to the four slots D0 to D3 of the main decoder MDEC, four instructions at a time in the order of PB0 to PB2, PD0 to PD3.

A pre-decoder-pre-buffer control unit PD/PB_CNT generates the first enable signal EN1, the second enable signal EN2, and the respective select signals SLCT0 to SLCT3 of the four selectors SL0 to SL3.

The first enable signal EN1 becomes an active "1" when the first slot PD0 of the pre-decoder PDEC is empty. When the first enable signal EN1 becomes an active "1", four new fletch instructions are inputted to the four slots PD0 to PD3 in response to the clock CLK.

The second enable signal EN2 becomes an active "1" when the pre-decoder buffers PB0 to PB2 and at least the first slot PD0 of the pre-decoder are empty. When the second enable signal EN2 becomes an active "1", multi-flow instructions or single instructions remaining in the three slots PD1 to PD3 of the pre-decoder are inputted to the three slots PB0 to PB2 of the pre-decoder buffer in response to the clock CLK.

Then the pre-decoder/pre-buffer control unit PD/PB_CNT generates four select signals SLCT0 to SLCT3, so that the divided instructions or single instructions in the three slots PB0 to PB2 of the pre-decoder buffer and the four slots PD0 to PD3 of the pre-decoder are entered to the four slots D0 to D3 of the main decoder MDEC, four instructions at a time, in the order of PB0 to PB2 and PD0 to PD3 (in order).

Figure 4:
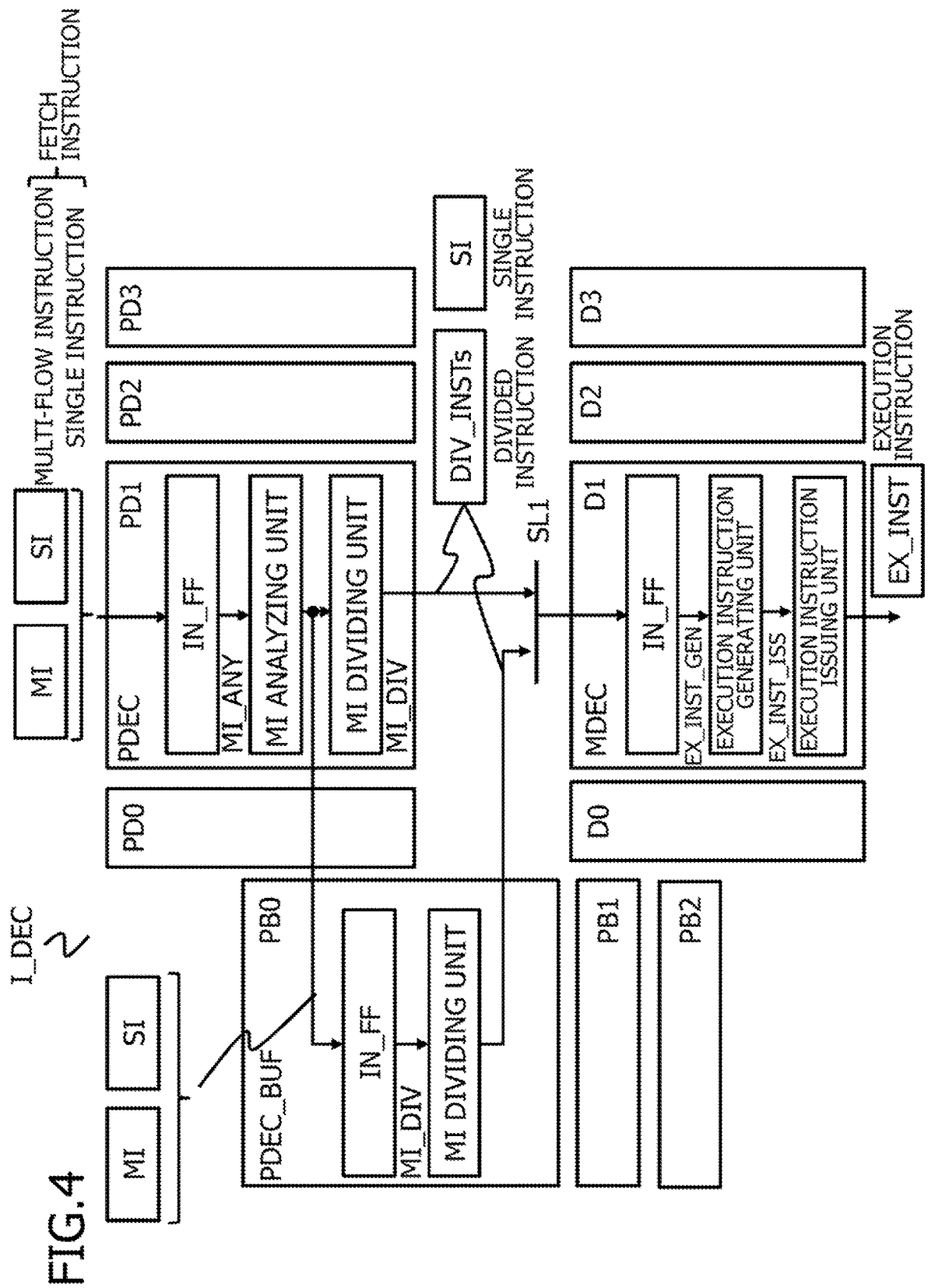
FIG. 4 is a diagram illustrating a detailed configuration example of one slot PD1 of the pre-decoder, one slot PB0 of the pre-decoder buffer, and one slot D1 of the main decoder of the instruction buffer.

FIG. 4 is a diagram illustrating a detailed configuration example of one slot PD1 of the pre-decoder, one slot PB0 of the pre-decoder buffer, and one slot D1 of the main decoder of the instruction decoder I_DEC. The slot PD1 of the pre-decoder PDEC, for example, includes an input latch IN_FF to which a fetch instruction is inputted from the instruction buffer. As mentioned above, there are two types of fetch instructions from the instruction buffer: a multi-flow instruction MI, and a single instruction SI. A fetch instruction is an operation code of an instruction.

Further, the slot PD1 includes a multi-flow instruction analyzing unit MI_ANL which analyzes a multi-flow instruction and detects the number of flows (division number) of the multi-flow instruction, and a multi-flow instruction dividing unit MI_DIV which divides a multi-flow instruction based on the analysis result, and generates a plurality of flows (divided instructions) DIV_INSTs. The other slots PD0, PD2 and PD3 have a similar configuration.

The slot PB0 of the pre-decoder buffer PDEC_BUF includes an input latch IN_FF, to which a single instruction SI or a multi-flow instruction MI, analysis information thereof, and a remaining member of flows, are supplied from the slot PD1 of the pre-decoder. Further, the slot PB0 includes a multi-flow instruction dividing unit MI_DIV which divides a multi-flow instruction based on the multi-flow instruction and the remaining number of flows, and generates a plurality of flows (divided instructions) DIV_INSTs. The other slots PB1 and PB2 have a similar configuration.

One slot D1 of the main decoder, on the other hand, includes an input latch IN_FF to which a divided instruction DIV_INSTs or a single instruction SI is supplied from the pre-decoder PDEC or the pre-decoder buffer PDEC_BUF. Further, the slot D1 includes: an execution instruction generating unit EX_INST_GEN which decodes a divided instruction and/or the single instruction, and generates an execution type instruction (execution instruction) EX_INST; and an execution instruction issuing unit EX_INST_ISS which issues the execution instruction EX_INST.

The fetch instruction that is inputted to the instruction decoder is an operation code of the instruction. The execution instruction that is generated in the instruction decoder, on the other hand, is an instruction which includes a decoding result to enable execution of the operation code of the fetched instruction. For example, the execution instruction is an instruction which includes information that is used for operation, such as information on which a reservation station is used, which an arithmetic unit is used, and which data is used for an operand. The execution instruction generating unit EX_INST_GEN decodes a fetched instruction operation code, obtains information that is used for executing the operation, and generates the execution instruction.

As illustrated in FIG. 3, the slot PD0 of the pre-decoder PDEC enables instructions to be outputted to the four slots D0 to D3 of the main decoder MDEC, the slot PD1 enables instructions to be outputted to the three slots D1 to D3, the slot PD2 enables instructions to be outputted to the two slots D2 and D3, and the slot PD3 enables instructions to be outputted to the slot D3. On the other hand, the three slots PB0 to PB2 of the pre-decoder buffer PDEC_BUF enable instructions to be outputted to any of the four slots D0 to D3 of the main decoder.

This configuration allows four single instructions, supplied to the four slots PD0 to PD3 of the pre-decoder PDEC, to be transmitted to the four slots D0 to D3 of the main decoder MDEC simultaneously if no instructions exist in the pre-buffers PB0 to PB2. On the other hand, in the case when a multi-flow instruction is supplied to the first slot PD0 of the pre-decoder PDEC, a plurality of divided instructions, generated by dividing the multi-flow instruction, are transmitted to the four slots D0 to D3 of the main decoder MDEC in order. A divided instruction or a single instruction in each of the three slots PD1 to PD3 of the pre-decoder is transmitted to one of the three slots D1 to D3, together with the transmission of the divided instruction or single instruction of the first slot PD0 to the first slot D0 of the main decoder. Further, a single instruction or a divided instruction of a multi-flow instruction in each of the three slots PB0 to PB2 of the pre-decoder buffer PDEC_BUF may be transmitted to any of the slots D0 to D3 of the main decoder.

Figure 5:
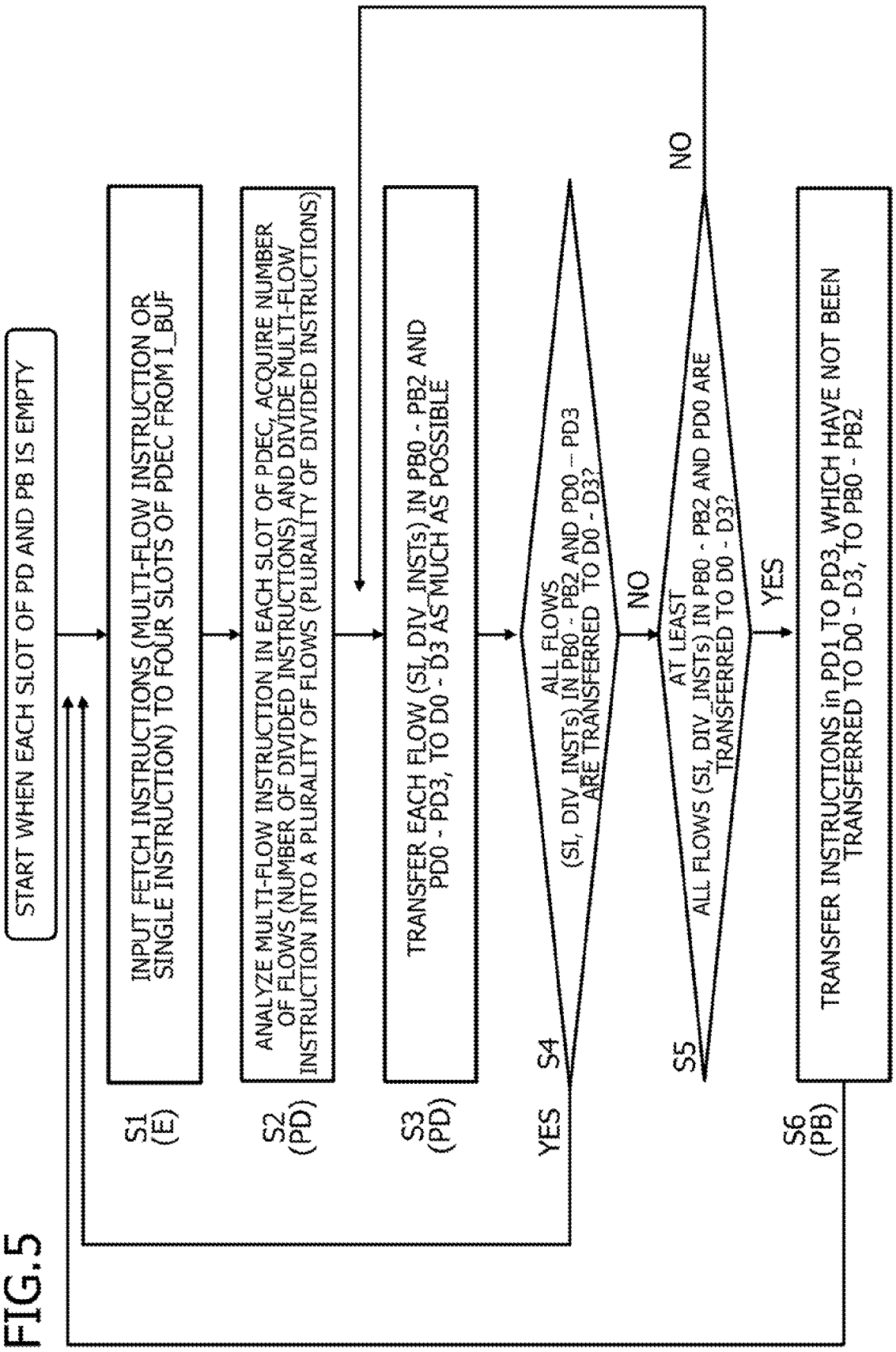
FIG. 5 is a flow chart illustrating an operation of the pre-decoder and the pre-decoder buffer in the instruction decoder.

FIG. 5 is a flow chart illustrating an operation of the pre-decoder and the pre-decoder buffer in the instruction decoder. When the instruction decoder I_DEC starts processing of a fetch instruction, it is assumed that no instruction is in any slot of the pre-decoder PDEC and the pre-decoder buffer PDEC_BUF.

Then a single instruction SI or a multi-flow instruction MI is supplied, in order, from the instruction buffer I_BUF to each of the four slots PD0 to PD3 of the pre-buffer in the order of PD0 to PD3 in order, and the input latch IN-FF in each slot PD0 to PD3 performs latching (S1).

In the case when a multi-flow instruction is supplied to any one of the four slots, the multi-flow instruction analyzing unit MI_ANL of each slot analyzes the respective multi-flow instruction, and detects the number of flows (number of divided instructions) (S2). Further, the multi-flow instruction dividing unit MI_DIV of each slot divides the respective multi-flow instruction to generate the divided instructions DIV_INSTs (S2).

Then the instruction decoder stores the single instruction SI or the divided instructions DIV_INSTs, in each of the three slots PB0 to PB2 of the pre-decoder buffer PDEC_BUF and four slots PD0 to PD3 of the pre-decoder PDEC, to the four slots D0 to D3 of the main decoder MDEC as much as possible, as a base of the number of divided flows (number of single instructions SI and divided instructions DIV_INSTs), in the order of PB0 to PB2 and PD0 to PD3 (S3). The single instruction and/or the divided instructions in the three slots PB0 to PB2 and the four slots PD0 to PD3 are transferred to the four slots D0 to D3 of the main decoder as much as possible, until the total of the number of the divided instructions in the four slots PD0 to PD3 is reached.

When all the flows (single instruction SI or divided instructions DIV_INSTs) in the slots PB0 to PB2 and PD0 to PD3 in the pre-decoder buffer and the pre-decoder are transferred to the slots D0 to D3 of the main decoder (YES in S4), four new fetch instructions are inputted from the instruction buffer I_BUF to the four slots PD0 to PD3 of the pre-decoder (S1).

In the initial state, since no instructions are stored in the slots PB0 to PB2, it is determined in S4 whether all the flows in the four slots PD0 to PD3 have been transferred to the slots D0 to D3 of the main decoder. In the initial state, when the four single instructions SI are inputted to the four slots PD0 to PD3, all four single instructions are able to be transferred to the four slots D0 to D3 of the main decoder. In the case when a multi-flow instruction is inputted to any one of the four slots PD0 to PD3, the determination in S4 becomes NO, since the number of flows after the division is at least 5.

When all the flows in the slots PB0 to PB2 and PD0 to PD3 are not transferred to the slots D0 to D3 of the main decoder (NO in S4), and when it is impossible to transfer at least all the flows (SI or DIV_INSTs) in the slots PB0 to PB2 and PD0 to the four slots D0 to D3 of the main decoder (NO in S5), the steps S3 and S4 are repeated.

On the other hand, when all the flows in the slots PB0 to PB2 and PD0 to PD3 are not transferred to the four slots of the main decoder (NO in S4), but at least all the flows (SI or DIV_INSTs) in the slots PB0 to PB2 and PD0 have been transferred to the four slots D0 to D3 of the main decoder (YES in S5), the three slots PD1, PD2 and PD3 of the pre-decoder transfer the remaining instructions, which have not been transferred to D0 to D3 of the main buffer, to the three slots PB0 to PB2 of the pre-decoder buffer PDEC_BUF in the order of PB0, PB1 and PB2 (S6). The remaining instructions, which have not been transferred to D0 to D3 of the main buffer, are a single instruction SI and/or a multi-flow instruction MI, and when the remaining number of flows and the MI analysis information are also transferred with the multi-flow instruction MI being transferred.

Returning to the first step S1, the four slots PD0 to PD3 of the pre-decoder PDEC input four new fetch instructions from the instruction buffer I_BUF (S1) in order.

As described above, four fetch instructions (single instruction SI or multi-flow instruction MI) are simultaneously inputted to the four slots PD0 to PD3 of the pre-decoder PDEC. Then a multi-flow instruction is divided in the slots PD0 to PD3 of the pre-decoder, and the single instruction SI and/or the divided instructions DIV_INSTs are transferred from the slots PD0 to PD3 of the pre-decoder to the slots D0 to D3 of the main decoder. When all the instructions in at least the first slot PD0 of the pre-decoder are transferred to the main decoder, fetch instructions remaining in the pre-decoder are temporarily transferred to the three slots PB0 to PB2 of the pre-decoder buffer, and at the same time, four new fetch instructions are inputted from the instruction buffer I_BUF. Then each single instruction and/or divided instruction in the three slots PB0 to PB2 of the pre-decoder buffer and the four slots PD0 to PD3 of the pre-decoder is transferred to the four slots D0 to D3 of the main decoder four flows (four instructions) at a time.

As illustrated in FIG. 5, the instruction decoder I_DEC includes the pre-decoder PDEC which analyzes and divides a multi-flow instruction, and the main decoder MDEC which decodes a single instruction and/or a divided instruction, and generates an execution instruction. In the case when a multi-flow instruction is divided into a plurality of divided instructions and all the instructions in the pre-decoder are not transferred to the main decoder, but at least the first slot PD0 of the pre-decoder is empty, the remaining instructions in the pre-decoder are temporarily transferred to the three slots PB0 to PB2 of the pre-decoder buffer, and the four new fetch instructions are inputted to the four slots of the pre-decoder. This configuration suppresses a drop in throughput of the instruction decoder I_DEC, since the instruction decoder issues four execution instructions in each cycle, even if a multi-flow instruction is included in the fetch instructions.

FIG. 6 and FIG. 7 are timing charts for describing the operation of the instruction decoder in FIG. 4 and FIG. 5 based on a concrete example of a fetch instruction string. The concrete example of the fetch instruction string is as follows.

MI_1 (3-division instruction (3dI))
MI_2 (6-division instruction (6dI))
MI_3 (2-division instruction (2dI))
SI_4 to SI_8

FIG. 6 indicates an entry cycle E, a pre-decode cycle PD, a pre-decoder buffer cycle PB, and a main decode cycle D of each fetch instruction in cycles C0 to C5. FIG. 7 indicates fetch instructions MI_#, SI_# and divided instructions MI_#1 to MI_#6 (# is an order of the fetch instruction) in the four slots PD0 to PD3 of the pre-decoder and the three slots PB0 to PB2 of the pre-decoder buffer, in cycles C0 to C5.

Cycle C0

The four fetch instructions MI_1, MI_2, MI_3 and SI_4 are simultaneously inputted (entered) to the four slots PD0 to PD3 of the pre-decoder (S1).

Cycle C1

The slots PD0 to PD2 analyze the multi-flow instructions MI_1, MI_2 and MI_3 respectively, that these multi-flow instructions have 3 flows, 6 flows and 2 flows respectively, and generates divided instructions of the same number as the number of flows, respectively (S2).

Cycle C2

The three divided instructions MI_11, MI_12 and MI_13 in the slot PD0, and one divided instruction MI_21 in slot PD1, are transferred to the four slots D0 to D3 of the main decoder (S3), the four slots D0 and D3 respectively decode the instructions, and generate and issue an execution instruction. At this time, the three divided instructions MI_11, MI_12 and MI_13 in the first slot PD0 of the pre-decoder are all transferred to the slots D0 to D3 of the main decoder (YES in S5). Therefore the fetch instructions MI_2, MI_3 and SI_4 remaining in the slots PD1 to PD3 of the pre-decoder are transferred to the three slots PB0 to PB2 of the pre-decoder buffer PDEC_BUF (S6). At the same time, the four new fetch instructions SI_5 to SI_8 are inputted to the four slots PD0 to PD3 of the pre-decoder (S1).

Cycle C3

The four divided instructions MI_22, MI_23, MI_24 and MI_25 of the multi-flow instruction MI_2 in the slot PB0 are transferred to the slots D0 to D3 of the main decoder (S3), and are issued as decoded execution instructions. At this time, the instruction SI_5 in the first slot PD0 of the pre-decoder still remains (NO in S5), hence the remaining instructions in the pre-decoder are not transferred to the pre-decoder buffer.

Cycle C4

The last divided instruction MI_26 of the multi-flow instruction MI_2 in the slot PB0, the two divided instructions MI_31 and MI_32 of the multi-flow instruction MI_3 in the slot PB1, and the single instruction SI_4 in the slot PB2, are transferred to the slots D0 to D3 of the main decoder (S3), and are decoded and issued as execution instructions. At this time, the instruction SI_5 in the first slot PD0 of the pre-decoder still remains (NO in S5), hence the instructions in the pre-decoder are not transferred to the pre-decoder buffer.

Cycle C5

The four single instructions SI_5 to SI_8 in the slots PD0 to PD3 are transferred to the slots D0 to D3 of the main decoder (S3), and are decoded and issued as execution instructions. At this time, the instructions in all the slots PD0 to PD3 of the pre-decoder are transferred, and the slots PD0 to PD3 become empty (YES in S4), hence subsequent new single instructions SI_9 to SI_12 are inputted to the four slots PD0 to PD3 of the pre-decoder.

Cycle C6

The four single instructions SI_9 to SI_12 in the slots PD0 to PD3 are transferred to the slots D0 to D3 of the main decoder (S3), and are decoded and issued as execution instructions.

As described in FIG. 5 and FIG. 6, even if a multi-flow instruction is included in the fetch instructions, the four slots D0 to D3 of the main decoder MDEC of the instruction decoder continues issuing four execution instructions per cycle. This suppresses a drop in throughput of the instruction decoder.

In this instruction decoder, the pre-decoder and the main decoder include four slots respectively, and the pre-decoder buffer includes three slots. In general terms, the pre-decoder and the main decoder include N number of slots respectively, and the pre-decoder buffer includes N−K number of slots. The above-mentioned instruction decoder is a case when N=4 and K=1.

In the case when N=4 and K=2 in the instruction decoder, the pre-decoder and the main decoder include four slots respectively, and the pre-decoder buffer includes two slots. In this case, in step S5 in FIG. 5, when all the instructions in the two slots PB0 and PB1 of the pre-decoder buffer and at least two first slots PD0 and PD1 of the pre-decoder are all transferred to the main decoder (YES in S5), the fetch instructions in the remaining two slots PD2 and PD3 of the pre-decoder are transferred to the two slots PB0 and PB1 of the pre-decoder buffer (S6), and four new fetch instructions are inputted to the four slots of the pre-decoder at the same cycle (S1).

Embodiment 2

Figure 8:
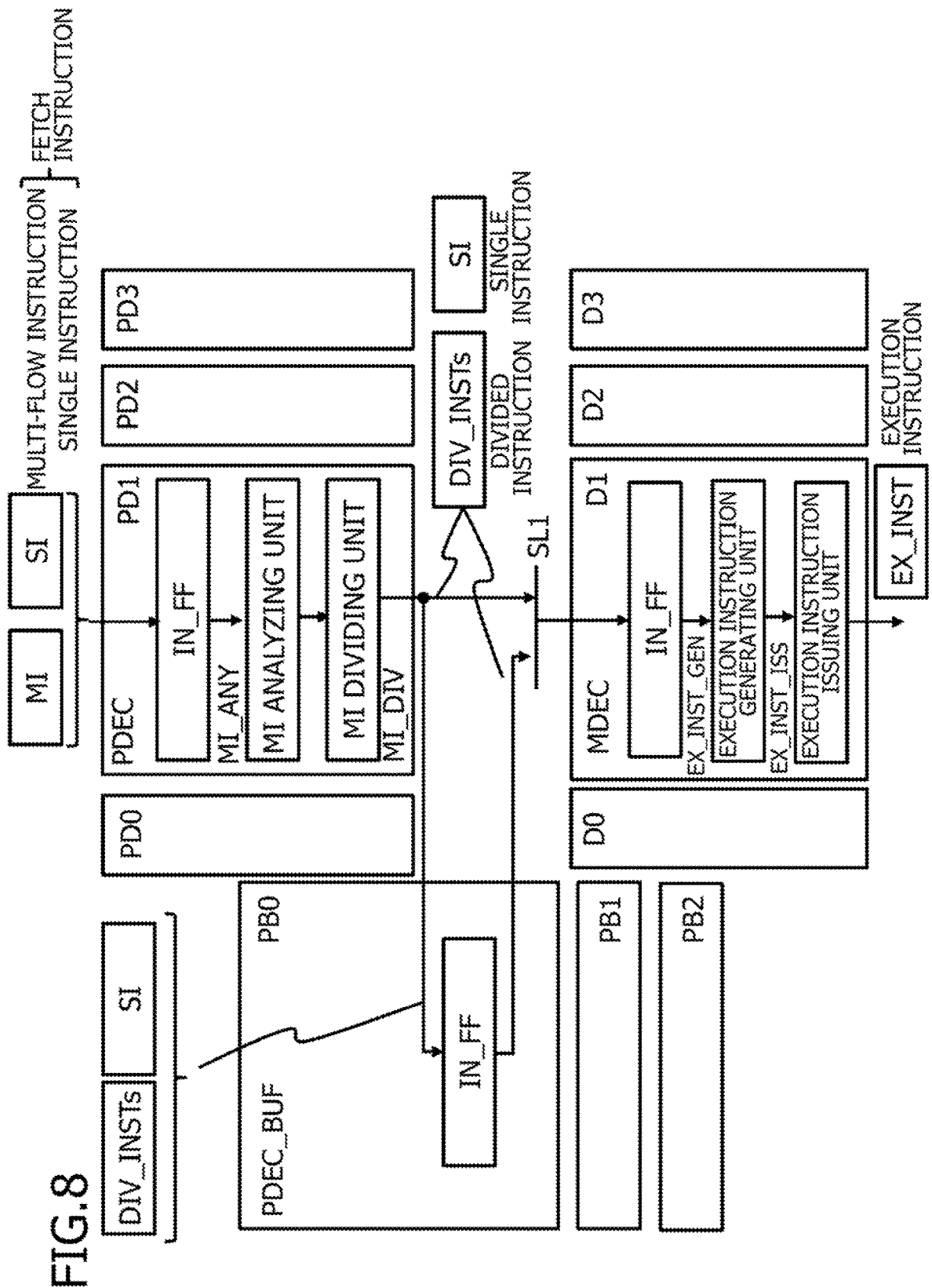
FIG. 8 is a diagram illustrating a configuration example of an instruction decoder I_DEC according to Embodiment 2.

FIG. 8 is a diagram illustrating a configuration example of an instruction decoder I_DEC according to Embodiment 2. This instruction decoder in FIG. 8 is different from the configuration in FIG. 4 in the configuration inside the pre-decoder buffer PDEC_BUF. In other words, the slot PB0 of the pre-decoder buffer includes an input latch IN_FF which input and latches divided instructions DIV_INSTs, divided by the multi-flow instruction dividing unit MI_DIV in the slot PD1 of the pre-decoder PDEC. The slot PB0 of the pre-decoder buffer does not include the multi-flow instruction dividing unit.

Embodiment 2 is applicable when a maximum division number of the multi-flow instruction is relatively small. In other words, the input latch IN_FF in the slot PB0 latches all or the remaining divided instructions DIV_INSTs, divided by the multi-flow instruction dividing unit MI_DIV in the slot PD1 of the pre-decoder PDEC, hence in order to conserve the number of resources of the latch circuit, Embodiment 2 is suitable for a case when the maximum division number of the multi-flow instruction is relatively small.

The multi-flow instruction dividing unit uses a relatively large number of selection logic circuit resources. Therefore the configuration of Embodiment 2 is selected when the circuit resources of the input latch IN_FF, which latches the divided instructions of the maximum division number, are less than the circuit resources of the multi-flow instruction dividing unit.

Embodiment 3

Figure 9:
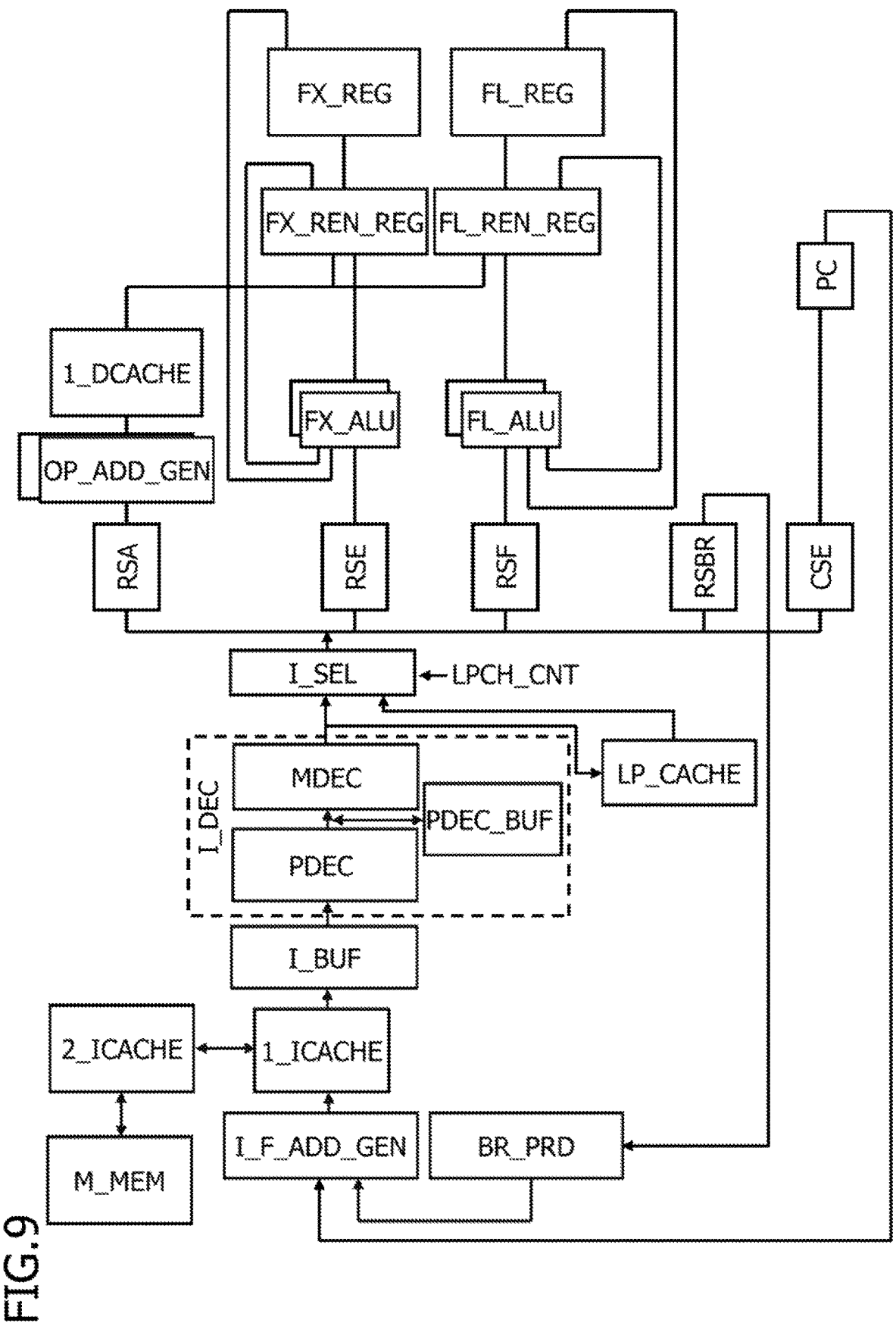
FIG. 9 is a diagram illustrating a configuration example of an arithmetic processing unit according to Embodiment 3.

FIG. 9 is a diagram illustrating a configuration example of an arithmetic processing unit according to Embodiment 3. A difference from FIG. 2 is that a loop cache LP_CACHE and an instruction selector I_SEL are included between the instruction decoder I_DEC and the reservation stations RSA, RSE, RSF and the like.

The loop cache LP_CACHE registers execution instructions in one loop, out of the execution instructions issued by the instruction decoder I_DEC, and instead of the instruction decoder, the loop cache issues the execution instructions in the loop after registration. The instruction selector I_SEL selects an execution instruction issued by the loop cache by setting a loop cache control signal LPCH_CNT to "1", and queues the execution instruction in the reservation station corresponding to this execution instruction.

While the loop cache issues execution instructions instead of the instruction decoder I_DEC, operations of the instruction decoder I_DEC, the instruction buffer I_BUF, the primary instruction cache L1CACHE, the secondary instruction cache 2_ICACHE, the instruction fetch address generating circuit I_F_ADD_GEN and the branch prediction circuit BR_PRD stop. This results in saving power.

When the branch prediction circuit BR_PRD predicts the loop processing based on the address generated by the instruction fetch address generating circuit, the loop cache determines whether an instruction issued by the instruction decoder I_DEC is an instruction in the loop, using a loop processing tag which is outputted to the instruction buffer I_BUF. If it is determined that the instruction is an instruction in the loop, the loop cache registers (stores) the execution instruction in the loop, changes the above-mentioned loop cache control signal LPCH_CNT to "1", and issues the registered execution instructions in the loop in order.

In Embodiment 3 as well, the instruction decoder I_DEC has the same configuration as FIG. 3 and FIG. 4. The instruction decoder in FIG. 3 and FIG. 4 includes the multi-flow instruction dividing unit MI_DIV in the four slots PD0 to PD3 of the pre-decoder and the three slots PB0 to PB2 of the pre-decoder buffer. However, a selection logic circuit, to divide a multi-flow instruction in the multi-flow instruction dividing unit, is of large scale. Therefore in Embodiment 3, the loop cache is disposed to perform processing to issue instructions in the loop. The decrease in power consumption of the loop cache compensates an increase in power consumption of the instruction decoder that improves the throughput.

As described above, according to the instruction decoder of the present embodiments, a drop in throughput of the instruction decoder can be suppressed, even if a multi-flow instruction is included in the fetch instructions. According to the first aspect, the drop in throughput of the instruction decoder caused by the multi-flow instruction can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing unit comprising:
an instruction decoder which decodes fetch instructions fetched from a memory to issue execution instructions;
a reservation station which temporarily stores the execution instructions issued by the instruction decoder; and
an arithmetic unit which executes the execution instructions stored in the reservation station,
wherein each of the fetch instructions includes one of a multi-flow instruction, having a plurality of divided instructions, and a single instruction,
wherein the instruction decoder includes:
a pre-decoder including N number of slots (N is a first positive integer) each of which inputs one of the fetch instructions, detects a division number of the multi-flow instruction, and divides the multi-flow instruction into the plurality of divided instructions;
a main decoder including a corresponding N number of slots each of which decodes one of the divided instructions or the single instruction to issue an execution instruction corresponding to the one of the divided instructions or the single instruction; and
a pre-decoder buffer including N−K number of slots (K is a second positive integer, N>K) which temporarily stores the fetch instructions in the pre-decoder, and
wherein the instruction decoder:
inputs N number of the fetch instructions into the N number of slots of the pre-decoder, respectively,
transfers at least one of single instructions and the divided instructions in the pre-decoder to up to the N number of slots of the main decoder in order starting from a first slot of the pre-decoder without going through the pre-decoder buffer, and
repeatedly, when transfer is completed from the first slot (where K=1), or a first K number of slots, of the pre-decoder to the main decoder, transfers up to N−K remaining fetch instructions in the pre-decoder to the pre-decoder buffer, and inputs a next N number of the fetch instructions to the N number of slots of the pre-decoder, respectively, and after execution instructions have been issued from all the N number of slots of the main decoder, transfers any remaining divided instructions and remaining single instructions in the N number of slots of the pre-decoder and the N−K number of slots of the pre-decoder buffer to the N number of slots of the main decoder, first from the pre-decoder buffer and then from the pre-decoder without going through the pre-decoder buffer.

2. The arithmetic processing unit according to claim 1, wherein when all the divided instructions and all the single instructions in the N−K number of slots of the pre-decoder buffer and the N number of slots of the pre-decoder are transferred to the main decoder, the instruction decoder inputs the next N number of fetch instructions to the N number of slots of the pre-decoder respectively.

3. The arithmetic processing unit according to claim 1, wherein K is 1.

4. The arithmetic processing unit according to claim 1, further comprising:
a loop cache which, when the instruction decoder issues a plurality of execution instructions in a loop, stores the plurality of execution instructions in the loop; and an instruction selector which, when the instruction decoder issues the plurality of execution instructions in the loop, selects the plurality of execution instructions in the loop issued by the instruction decoder, and which, when the loop cache issues the plurality of execution instructions in the loop after the instruction decoder issues the plurality of execution instructions in the loop, selects the plurality of execution instructions in the loop issued by the loop cache and supplies the selected execution instructions to the reservation station.

5. The arithmetic processing unit according to claim 4, wherein the instruction decoder is controlled to stop operation while the instruction selector selects the execution instructions issued by the loop cache.

6. A method of controlling an arithmetic processing unit, the method comprising:

decoding, by the arithmetic processing unit in an instruction decoder, a fetch instruction fetched from a memory to issue an execution instruction;

temporarily storing, in a reservation station, the execution instruction issued by the instruction decoder; and executing, by an arithmetic unit, the execution instruction stored in the reservation station, the fetch instruction including one of a multi-flow instruction divided into a plurality of divided instructions, and a single instruction which is not divided, wherein the instruction decoder has a pre-decoder, including N number of slots (N is a first positive integer), a pre-decoder buffer including N−K number of slots (K is a second positive integer, N>K), and a main decoder including N number of slots, and performs operations of:

inputting N number of fetch instructions into N number of slots in the pre-decoder, respectively, detecting a division number of the multi-flow instruction, dividing the multi-flow instruction into a plurality of divided instructions, transferring at least one of single instructions and the divided instructions in the pre-decoder to up to the N number of slots in the main decoder in order starting from a first slot of the pre-decoder without going through the pre-decoder buffer, each slot of the main decoder decoding one of the divided instructions or the single instruction to issue and execution instruction corresponding to the one of the divided instructions or the single instruction, and repeatedly, when transfer is completed from the first slot (where K=1), or a first K number of slots, of the pre-decoder to the main decoder, transferring up to N−K remaining fetch instructions in the pre-decoder to the pre-decoder buffer and inputting a next N number of the fetch instructions to the N number of slots of the pre-decoder, respectively, and after execution instructions have been issued from all the N number of slots of the main decoder, transferring any remaining divided instructions and remaining single instructions in the N number of slots of the pre-decoder and the N−K number of slots of the pre-decoder buffer to the N number of slots of the main decoder, first from the pre-decoder buffer and then from the pre-decoder without going through the pre-decoder buffer.

* * * * *